United States Patent
Wang et al.

(10) Patent No.: US 11,997,041 B2
(45) Date of Patent: May 28, 2024

(54) EARLY TERMINATION SCHEME FOR BLIND DECODING OF A DOWNLINK CONTROL CHANNEL

(71) Applicant: AT&T INTELLECTUAL PROPERTY I, L.P., Atlanta, GA (US)

(72) Inventors: Xiaoyi Wang, Austin, TX (US); Ralf Bendlin, Portland, OR (US); Arunabha Ghosh, Austin, TX (US); SaiRamesh Nammi, Kista (SE)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1016 days.

(21) Appl. No.: 16/903,452

(22) Filed: Jun. 17, 2020

(65) Prior Publication Data
US 2020/0313826 A1    Oct. 1, 2020

Related U.S. Application Data

(63) Continuation of application No. 16/395,347, filed on Apr. 26, 2019, now Pat. No. 10,728,004, which is a (Continued)

(51) Int. Cl.
*H04L 5/00* (2006.01)
(52) U.S. Cl.
CPC ................. *H04L 5/0053* (2013.01)
(58) Field of Classification Search
CPC ............ H04L 5/0053; H04L 27/26025; H04L 5/0091; H04W 72/042
See application file for complete search history.

(56) References Cited

U.S. PATENT DOCUMENTS

| 8,606,286 B2 | 12/2013 | Vrzic et al. |
| 8,681,906 B2 | 3/2014 | Malladi et al. |

(Continued)

FOREIGN PATENT DOCUMENTS

| EP | 2557871 A1 | 2/2013 |
| WO | 2011047506 A1 | 4/2011 |

(Continued)

OTHER PUBLICATIONS

Hosein, Patrick, "Resource Allocation for the LTE Physical Downlink Control Channel", GLOBECOM Workshops, IEEE, 2009, 5 pages.

(Continued)

*Primary Examiner* — Ronald B Abelson
(74) *Attorney, Agent, or Firm* — Guntin & Gust, PLC; Dana B. LeMoine

(57) ABSTRACT

An early termination system for blind decoding is provided to decrease the computational resources utilized when decoding the physical resources, and decrease the time spent decoding. A blind decoding priority list can be used by the mobile device to preferentially decode specific physical resource elements as it specifies the order of all the candidate physical downlink control channels (PDCCHs). When the physical resource elements are decoded, if there is no more downlink control information in that transmission time interval, the downlink control information can include a termination bit, and the mobile device, upon identifying the termination bit can cease blind decoding of the remainder candidates. In this way, the blind decoding process more quickly identifies the downlink control information, and subsequent blind decoding is halted.

20 Claims, 10 Drawing Sheets

Related U.S. Application Data continuation of application No. 15/431,608, filed on Feb. 13, 2017, now Pat. No. 10,326,578.

(56) References Cited

U.S. PATENT DOCUMENTS

| | | | |
|---|---|---|---|
| 8,958,366 | B2 | 2/2015 | Heo et al. |
| 8,989,121 | B2 | 3/2015 | Luo et al. |
| 9,312,997 | B2 | 4/2016 | Kim et al. |
| 9,414,263 | B2 | 8/2016 | Park et al. |
| 9,419,763 | B2 | 8/2016 | Jang et al. |
| 2010/0302983 | A1* | 12/2010 | McBeath .......... H04W 72/0406 |
| 2010/0322132 | A1 | 12/2010 | Ramakrishna et al. |
| 2013/0121274 | A1 | 5/2013 | Chen et al. |
| 2014/0099945 | A1* | 4/2014 | Singh .................... H04W 48/18 |
| 2014/0133427 | A1* | 5/2014 | Kim ....................... H04L 5/0053 |
| 2014/0177581 | A1 | 6/2014 | Zhang et al. |
| 2015/0351115 | A1 | 12/2015 | Jeon et al. |
| 2016/0007337 | A1 | 1/2016 | Hessler et al. |
| 2016/0226629 | A1 | 8/2016 | Liu et al. |
| 2016/0353421 | A1 | 12/2016 | Liao et al. |
| 2017/0150367 | A1 | 5/2017 | Han et al. |

FOREIGN PATENT DOCUMENTS

| | | |
|---|---|---|
| WO | 2011134350 A1 | 11/2011 |
| WO | 2016127819 A1 | 8/2016 |

OTHER PUBLICATIONS

Nwawelu et al., "Comparative Analysis of the Performance of Resource Allocation Algorithms in Long Term Evolution Networks", Nigerian Journal of Technology, vol. 36, No. 1, Jan. 2017, pp. 163-171.

Non-Final Office Action received for U.S. Appl. No. 15/431,608 dated Apr. 19, 2018, 18 pages.

Non-Final Office Action received for U.S. Appl. No. 15/431,608 dated Aug. 27, 2018, 12 pages.

Non-Final Office Action received for U.S. Appl. No. 16/395,347 dated Dec. 2, 2019, 22 pages.

* cited by examiner

500

| | Search space $S_k^{(L)}$ | | Number of PDCCH |
|---|---|---|---|
| Type | Aggregation level $L$ | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

EARLY TERMINATION SCHEME FOR BLIND DECODING OF A DOWNLINK CONTROL CHANNEL

RELATED APPLICATION

The subject patent application is a continuation of, and claims priority to each of, U.S. patent application Ser. No. 16/395,347, filed Apr. 26, 2019, and entitled "EARLY TERMINATION SCHEME FOR BLIND DECODING OF A DOWNLINK CONTROL CHANNEL," which is a continuation of U.S. patent application Ser. No. 15/431,608 (now U.S. Pat. No. 10,326,578), filed Feb. 13, 2017, and entitled "EARLY TERMINATION SCHEME FOR BLIND DECODING OF A DOWNLINK CONTROL CHANNEL," the entireties of which applications are hereby incorporated by reference herein.

TECHNICAL FIELD

The disclosed subject matter relates to an early termination mechanism for blind decoding of downlink control information in a wireless system to enable improvement of wireless system performance over conventional wireless system technologies, e.g., for fifth generation (5G) technologies or other next generation networks.

BACKGROUND

To meet the huge demand for data centric applications, third generation partnership project (3GPP) systems and systems that employ one or more aspects of the specifications of fourth generation (4G) standards for wireless communications will be extended to fifth generation (5G) standards for wireless communications. Unique challenges exist to provide levels of service associated with forthcoming 5G and/or other next generation standards for wireless networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 illustrates an example table showing aggregation levels for blind decoding in accordance with various aspects and embodiments of the subject disclosure.

DETAILED DESCRIPTION

Figure 1:
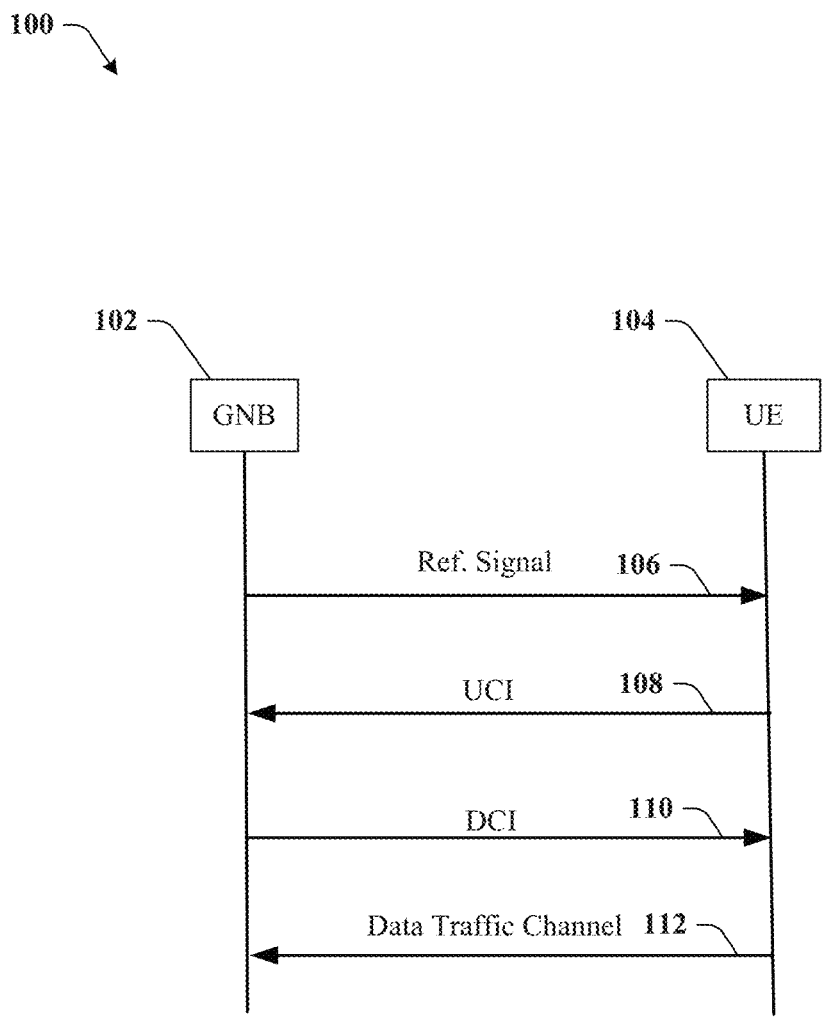
FIG. 1 illustrates an example schematic diagram of a message sequence chart for downlink control information in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In an embodiment, a system can comprise a processor and a memory that stores executable instructions that, when executed by the processor, facilitate performance of operations, including receiving a transmission comprising downlink control information that is encoded in a resource element in a search space of resource elements. The operations can also include iteratively decoding resource elements of the search space of resource elements to identify the downlink control information, wherein the iteratively decoding the resource elements is performed in an order based on a priority list, resulting in decoded resource element information. The operations can also include ceasing the iteratively decoding the resource elements in response to confirming that the decoded resource element information comprises the downlink control information.

In another embodiment, a method can include receiving, by a user equipment comprising a processor, a signal comprising downlink control information that is encoded in a resource element of a search space of resource elements. The method can also include decoding, by the user equipment, resource elements of the search space of resource elements to identify the downlink control information, wherein the decoding results in decoded resource elements, and wherein an order of the decoding of the resource elements is based on priority data associated with the user equipment. The method can also include halting, by the user equipment, the decoding of the resource elements in response to confirming that the decoded resource elements comprise the downlink control information.

In another embodiment, a machine-readable storage medium, comprising executable instructions that, when executed by a processor of a device, facilitate performance of operations. The operations can include receiving a transmission comprising downlink control information that is encoded in a resource element in a search space of resource elements. The operations can also include iteratively decoding resource elements of the search space of resource elements to identify the downlink control information in an order based on priority data. The operations can also include ceasing the iteratively decoding the resource elements in response to confirming that the resource elements as decoded according to the iteratively decoding comprise the downlink control information and further comprise a termination bit that indicates no subsequent downlink control information is to be included in a transmission time interval associated with the transmission.

Downlink control information is carried on a Physical Downlink Control Channel (PDCCH). The PDCCH can include a number of physical resources, or slots where data can be transmitted. The particular physical resource used during each transmission time interval or transmission can vary based on the network configuration. Therefore, the user equipment (UE) performs blind decoding on the set of physical resources, decoding each physical resource and extracting the relevant downlink control information from the decoded information blocks in the physical resources. The set of physical resources is called search space. In an Orthogonal Frequency Division Multiplexing (OFDM) system, physical resources are defined according to a 2D frequency and time map. Each physical resource element can correspond to one subcarrier and one OFDM symbol. And each blind decoding may be on a group of resource elements.

Using LTE as example, the blind decoding process includes several search space: one is common search space, one is UE specific search space. In common search, UE can blind decode all together 44 PDCCH candidates. Each candidate may include different number of resource elements. In UE specific search space, the number of candidate may be lower.

Accordingly, an early termination system for blind decoding is provided to decrease the computational resources utilized when decoding the physical resources, and decrease the time spent decoding. A blind decoding priority list can be used by the mobile device to preferentially decode specific physical resource elements as it specifies the order of all the candidate PDCCHs. When the physical resource elements are decoded, if there is no more downlink control information in that transmission time interval, the downlink control information can include a termination bit, and the mobile device, upon identifying the termination bit can cease blind decoding of the remainder candidates. In this way, the blind decoding process more quickly identifies the downlink control information, and subsequent blind decoding is halted.

In an embodiment, the blind decoding priority list can be defined in the specification (e.g., standards) for the wireless technology being used, when blind decoding is performed in common search space. In other embodiments, such as when the blind decoding is being performed in UE specific search space, the network can dynamically configure the priority list. In some embodiments, for a particular UE, the network can configure multiple priority lists. The network can activate a particular priority list for each transmission time interval. In an embodiment, the activation signaling is transmitted in group common PDCCH which can be received by a group of UEs.

Turning now to FIG. 1, illustrated is an example schematic diagram of a message sequence chart 100 for downlink control information in accordance with various aspects and embodiments of the subject disclosure. In an embodiment, a gNodeB 102 can send a reference signal 106 to a UE 104. The reference signal can be beamformed in some embodiments, or non beamformed in other embodiments.

Based on the reference signal 106, the UE 104 can measure the channel response, and determine channel state information (CSI) to give as feedback to the gNodeB 102. The channel state information can include a channel quality indicator, precoding matrix index, or advanced PMI. This channel state information can refer to the known channel properties of the communication link between the gNodeB 102 and the UE 104. The channel properties can reflect how the signal propagates from the transmitter to the receiver and represents the combined effect of, for example, scattering, fading, and power decay with distance. The method is called Channel estimation. The CSI makes it possible to adapt transmissions to current channel conditions. Based on the information being transmitted, in some embodiments, the amount of data required or number of bits to include in the UCI may vary. Therefore, adjusting the number of CRC bits can facilitate faster processing and higher throughput of the UCI transmission.

Once the channel state information is assembled, the UE 104 can transmit the UCI 108 to the gNodeB 102. Based, on the UCI 108, the gNodeB 102 can then send downlink control information (DCI) 110 to the UE 104 which enables the UE to send the data over the data traffic channel 112. The downlink link control information can be encoded in one or more physical resource elements in a transmission. The physical resource elements can correspond to one subcarrier and/or one OFDM symbol. The UE 104 can perform blind decoding of a set of PDCCH candidates that may contain the DCI 110. The number of candidates blindly decoded can be based on the search space and/or aggregation level of the channel. Depending on the search space, the UE 104 can use a priority list that ranks the candidates to decode, with the DCI 110 being more likely to be found in the higher priority resource elements.

When the UE 104 finds the DCI 110 in one or more of the physical resource elements, the UE 104 can look for a termination bit indicating that no more DCI is present in that TTI, and if the termination bit is found, the UE skips blind decoding the rest of the candidates.

Figure 2:
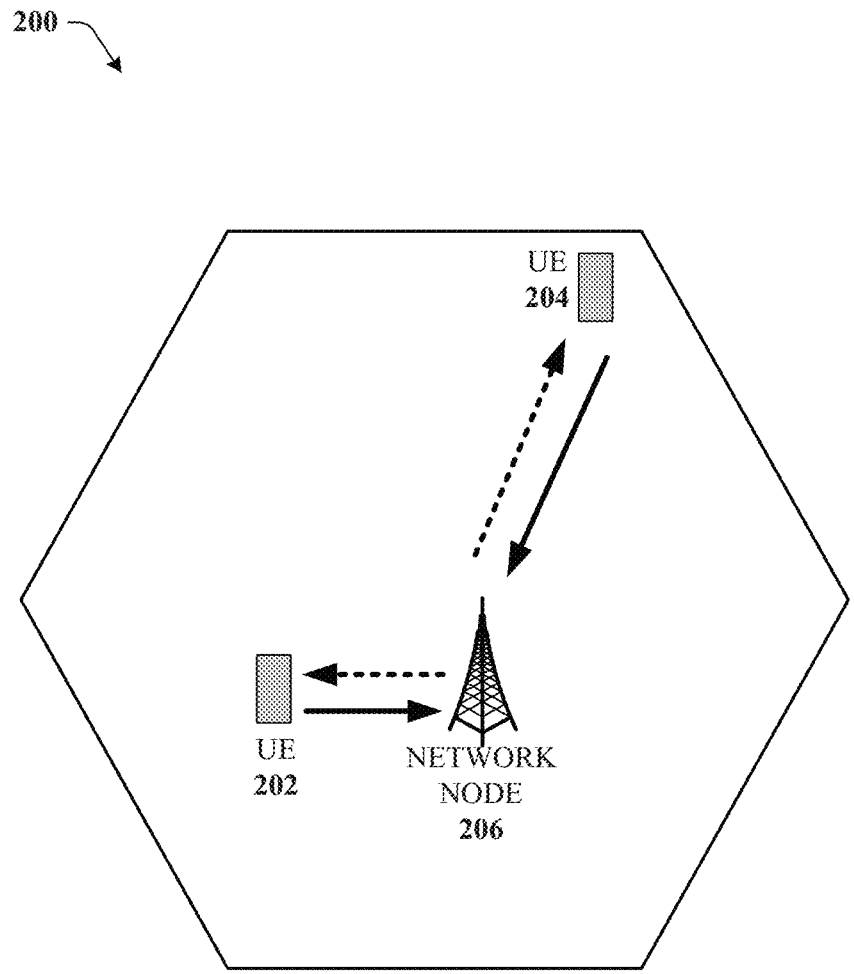
FIG. 2 illustrates an example block diagram of a wireless communication system that facilitates early termination of blind decoding in accordance with various aspects and embodiments of the subject disclosure.

Turning now to FIG. 2, illustrated is an example block diagram of a wireless communication system that facilitates early termination of blind decoding in accordance with various aspects and embodiments of the subject disclosure. In one or more embodiments, system 200 can comprise one or more user equipment UEs 204 and 202, which can have one or more antenna panels having vertical and horizontal elements. A UE 202 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 202 can also comprise IOT devices that communicate wirelessly. In various embodiments, system 200 is or comprises a wireless communication network serviced by one or more wireless communication network providers. In example embodiments, a UE 202 can be communicatively coupled to the wireless communication network via a network node or base station device 206.

The non-limiting term network node (or radio network node) is used herein to refer to any type of network node serving a UE 202 and UE 204 and/or connected to other network node, network element, or another network node from which the UE 202 or 204 can receive a radio signal. Network nodes can also have multiple antennas for performing various transmission operations (e.g., MIMO operations). A network node can have a cabinet and other protected enclosures, an antenna mast, and actual antennas.

Network nodes can serve several cells, also called sectors, depending on the configuration and type of antenna. Examples of network nodes (e.g., network node 206) can include but are not limited to: NodeB devices, base station (BS) devices, access point (AP) devices, and radio access network (RAN) devices. The network node 206 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 206 can be referred to as a gNodeB device.

In example embodiments, the UE 202 and 204 can send and/or receive communication data via a wireless link to the network node 206. The dashed arrow lines from the network node 206 to the UE 202 and 204 represent downlink (DL) communications and the solid arrow lines from the UE 202 and 204 to the network nodes 206 represents an uplink (UL) communication.

Wireless communication system 200 can employ various cellular technologies and modulation schemes to facilitate wireless radio communications between devices (e.g., the UE 202 and 204 and the network node 206). For example, system 200 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 200 are particularly described wherein the devices (e.g., the UEs 202 and 204 and the network device 206) of system 200 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 200 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In an embodiment the network node 206 can send downlink control information to each of UEs 204 and 202. The downlink link control information can be encoded in one or more physical resource elements in a transmission. The physical resource elements can correspond to one subcarrier and/or one OFDM symbol. The UEs can perform blind decoding of a set of PDCCH candidates that may contain the DCI, decoding each physical resource element until all the downlink control information is aggregated. The number of candidates blindly decoded can be based on the search space and/or aggregation level of the channel In an embodiment, there can be 44 PDCCH candidates for a common search space. Depending on the search space, either common or UE specific, the UE 204 and 202 can use a priority list that ranks the candidates to decode, with the DCI being more likely to be found in the higher priority resource elements.

When the UE 204 or 202 finds the DCI in one or more of the physical resource elements, the UEs can look for a termination bit indicating that no more DCI is present in that TTI, and if the termination bit is found, the UE skips blind decoding the rest of the candidates.

In an embodiment, the aggregation level, and thus the search space can be modified based on factors such as the channel state information (quality of connection). For instance, UE 204 is further from the network node 206 than is UE 202. The network can use an aggregation level with a lower rate for UE 206 than for UE 204. The priority list can thus be configured for UE 204 by the network to be different than the priority list configured for UE 202.

Figure 3:
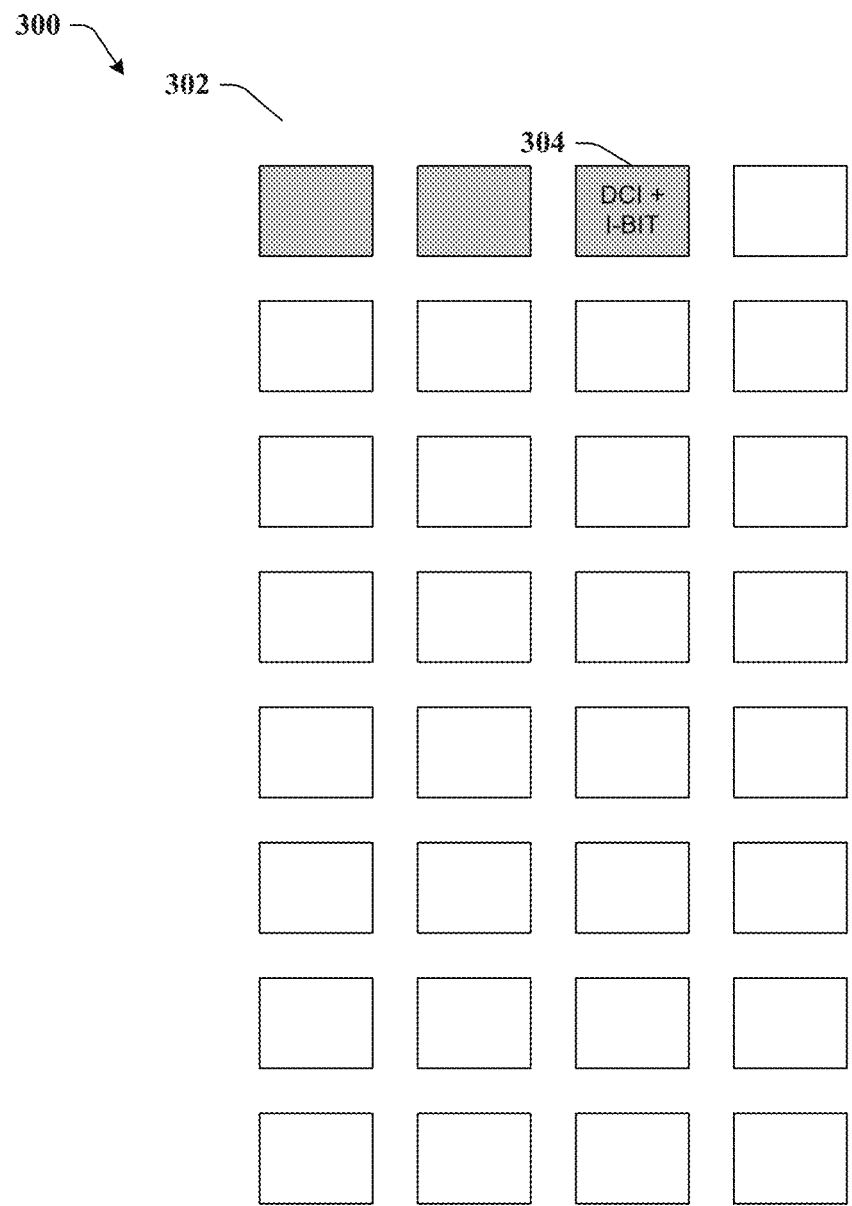
FIG. 3 illustrates an example block diagram of a set of resource elements that are to be blind decoded in accordance with various aspects and embodiments of the subject disclosure.

Turning now to FIG. 3, illustrated is an example block diagram 300 of a set of resource elements that are to be blind decoded in accordance with various aspects and embodiments of the subject disclosure.

The set of physical resource elements 302 can represent respective sub carriers and an OFDM symbol in a transmission time interval. Each box of the set of physical resource elements 302 can represent respective physical resource elements. In an embodiment, in conventional blind decoding, the UE would receive the set of physical resource elements 302 and blindly decode each of the physical resource elements to identify and/or search for the downlink control information.

Using the priority list however, the UE can decode the set of physical resources using the priority ranking specified in the list. The priority list can predict which physical resource elements are more likely to include the downlink control information for the UE, and so the downlink control information can be found more quickly and with less computational resources than traditional blind decoding.

Furthermore, the downlink control information can include a termination bit that indicates no additional downlink control information is included in the TTI. When the UE identifies the termination bit the UE can cease the blind decoding of any other physical resource elements.

In the embodiment shown in FIG. 3, instead of decoding every single physical resource element to find the DCI, the UE can decode the physical resource elements in an order defined by the priority list. Therefore, in the example embodiment shown in FIG. 3, the first three physical resource elements can be sequentially decoded, and when the DCI is found in block 304, along with a termination bit to indicate that no subsequent DCI follows, the UE can cease decoding the rest of the set of physical resource elements 302.

In other embodiments, it is to be appreciated that the downlink control information may span across more than one physical resource element, and may by spread around the set of physical resource elements 302 (i.e., not next to each other). In embodiments, the priority list can specify the exact location of the DCI, but in others, can merely indicate which PDCCH candidates are most likely to contain the DCI.

Figure 4:
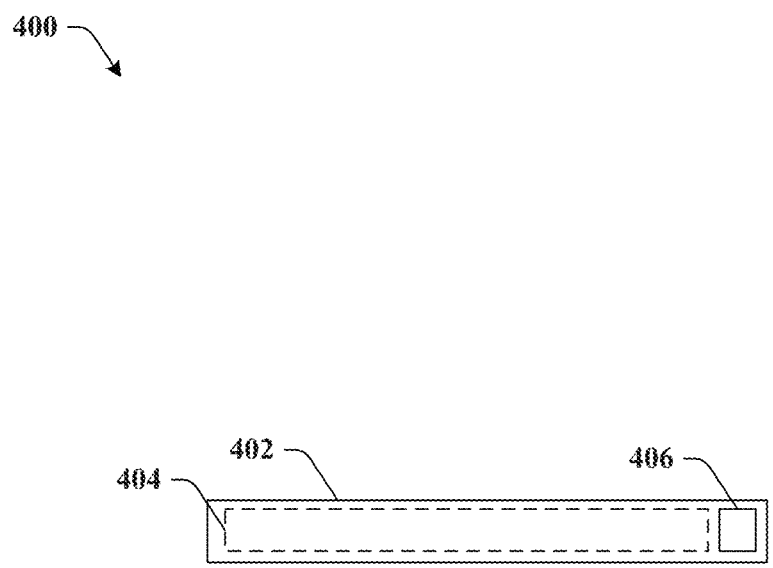
FIG. 4 illustrates an example block diagram of a resource element with a termination bit in accordance with various aspects and embodiments of the subject disclosure.

Turning now to FIG. 4, illustrated is an example block diagram 400 of a resource element 402 with a termination bit 406 in accordance with various aspects and embodiments of the subject disclosure. The termination bit 406 can be included with the downlink control information 404 in a physical resource elements to indicate that no more downlink control information follows in the transmission time interval. When the UE identifies the termination bit 406, the UE can skip decoding the subsequent PDCCH candidates.

In an embodiment, the termination bit 406 can be part of the downlink control information 404. In other embodiments, the termination bit 406 can precede the downlink control information in the block.

Turning now to FIG. 5, illustrated is an example table 500 showing aggregation levels for blind decoding in accordance with various aspects and embodiments of the subject disclosure. There can be different types 502 of aggregation levels 504, where each aggregation level 504 has a different size 506 and number of PDCCH candidate 508. The size 506 is derived by multiplying the number 508 of PDCCH candidates by the aggregation level 504.

For UE specific search spaces, there can be four aggregation levels, 1, 2, 4, and 8, with separate sizes and candidates per aggregation level. Each of the different aggregation levels can have different priority lists to facilitate the early termination of blind decoding by the UE when it receives the transmission from the base station device.

In various embodiments, the aggregation level can be configured by the base station device or the network for the UE based on a variety of factors, including the link quality of the UE and other quality of service concerns. For instance, a UE that is on a cell edge can use an aggregation level that is higher, such as level 8 since the number of PDCCH candidates are smaller, which can facilitate a lower code rate.

Figure 6:
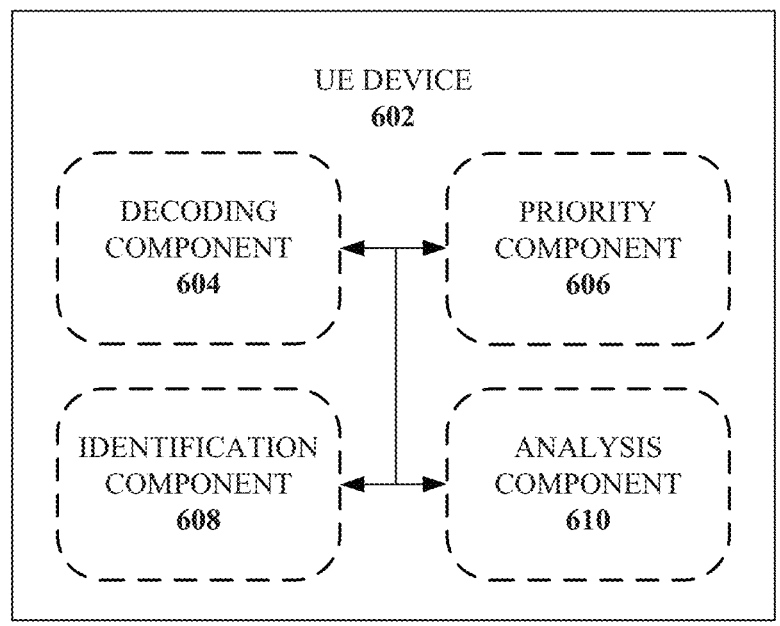
FIG. 6 illustrates an example block diagram of a mobile device that facilitates early termination for blind decoding of downlink control information in accordance with various aspects and embodiments of the subject disclosure.

Turning now to FIG. 6, illustrated is an example block diagram 600 of a mobile device 602 that facilitates early termination for blind decoding of downlink control information in accordance with various aspects and embodiments of the subject disclosure.

The mobile device can include a decoding component 604 that blindly decodes a set of physical resource elements in a transmission time interval using a priority list determined by the priority component 606. The priority component 606 can determine the priority based on whether the frame is in UE specific search space or common search space. If it is common search space, the priority component 606 can retrieve the priority list from a memory or from the network standards. If the search space is UE specific search space, the priority component 606 can receive the priority list from the network as the network configures the priority list for UE specific search space. In an embodiment, the network can define different priority lists for each aggregation level and based on various link quality factors associated with the UE device 602 (e.g., channel state information, etc.). The analysis component 610 can be used to determine the channel state information facilitate the priority component 606 in determining the priority list.

The identification component 608 can identify a termination bit in the decoded downlink control information and instruct the decoding component 604 to cease decoding the physical resource elements. The termination bit can indicate the no subsequent downlink control information is present in the transmission time interval.

Figure 7:
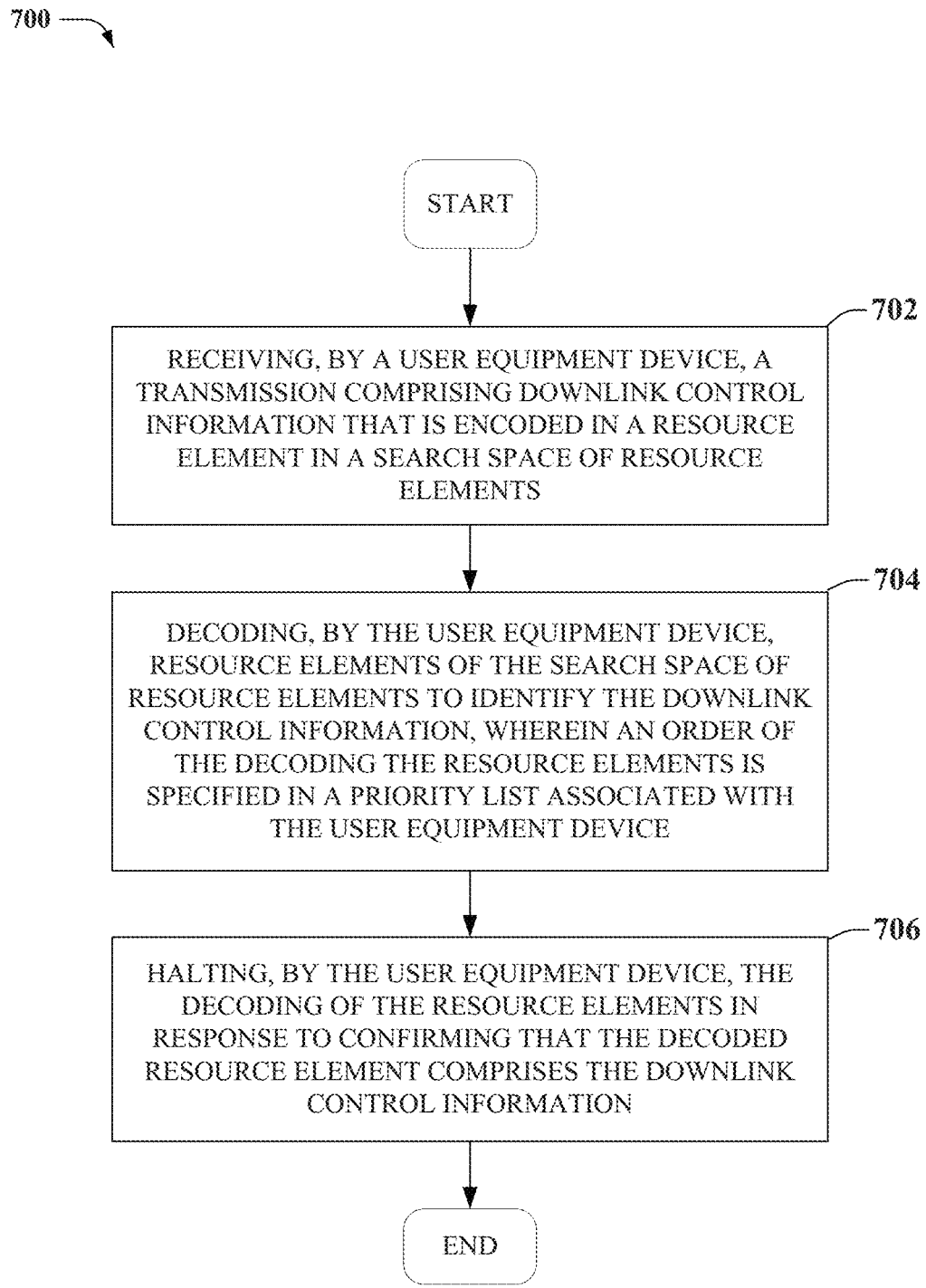
FIG. 7 illustrates an example method for early termination for blind decoding of downlink control information in accordance with various aspects and embodiments of the subject disclosure.
Figure 8:
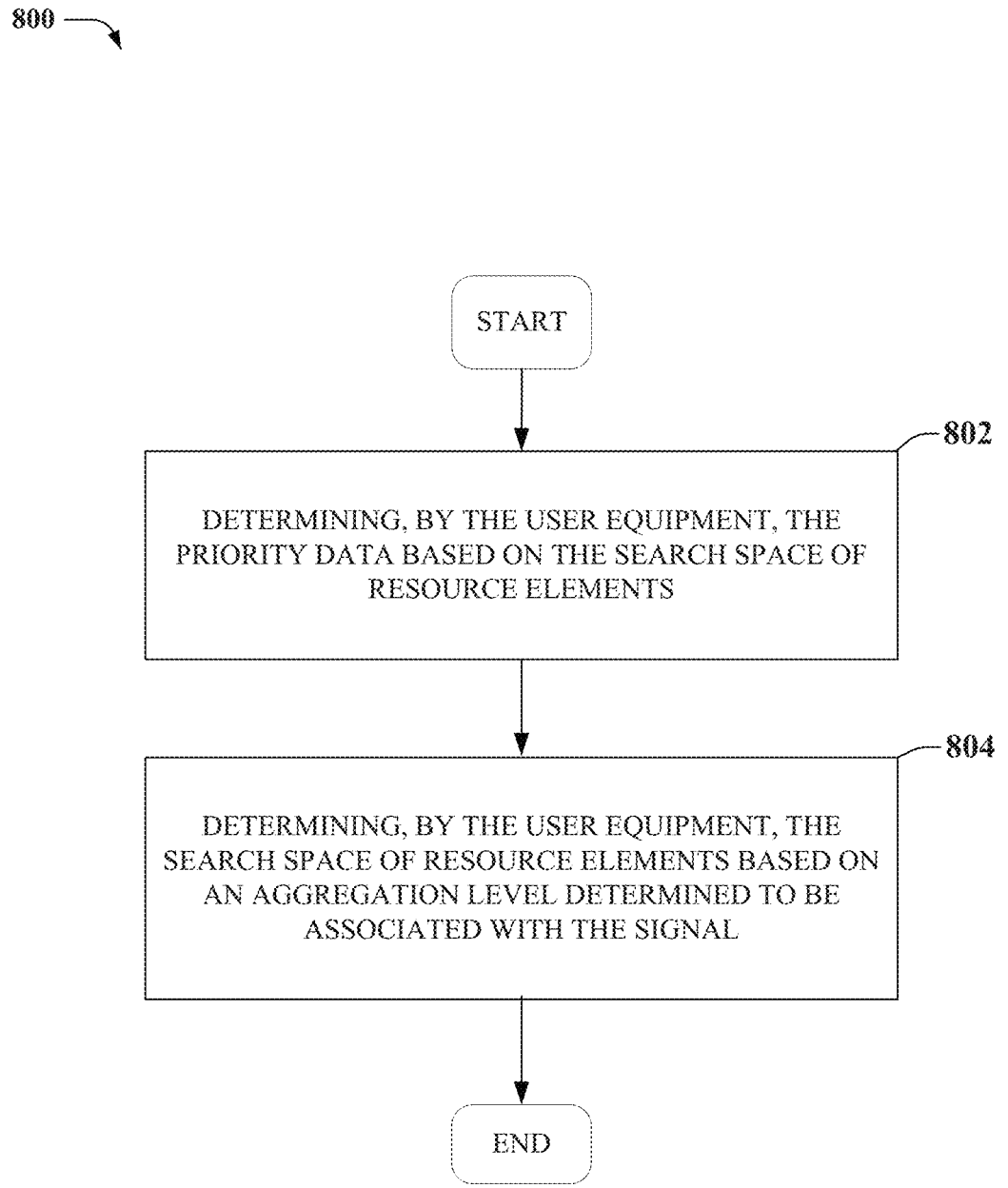
FIG. 8 illustrates an example method for early termination for blind decoding of downlink control information in accordance with various aspects and embodiments of the subject disclosure.

FIGS. 7-8 illustrates a process in connection with the aforementioned systems. The process in FIGS. 7-8 can be implemented for example by the systems in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 7, illustrated is an example method 700 for early termination for blind decoding of downlink control information in accordance with various aspects and embodiments of the subject disclosure.

Method 700 can start at 702 where the method includes receiving, by a user equipment comprising a processor, a signal comprising downlink control information that is encoded in a resource element of a search space of resource elements.

At 704 the method includes decoding, by the user equipment, resource elements of the search space of resource elements to identify the downlink control information, wherein the decoding results in decoded resource elements, and wherein an order of the decoding of the resource elements is specified in priority data associated with the user equipment (e.g., decoding component 604 and priority component 606).

At 706, the method includes halting, by the user equipment, the decoding of the resource elements in response to confirming that the decoded resource elements comprise the downlink control information (e.g., by identification component 608).

Turning now to FIG. 8, illustrated is another example method 800 for early termination for blind decoding of downlink control information in accordance with various aspects and embodiments of the subject disclosure.

The method can start at 802 where the method includes determining, by the user equipment, the priority data based on the search space of resource elements.

At 804 the method includes determining, by the user equipment, the search space of resource elements based on an aggregation level determined to be associated with the signal.

Figure 9:
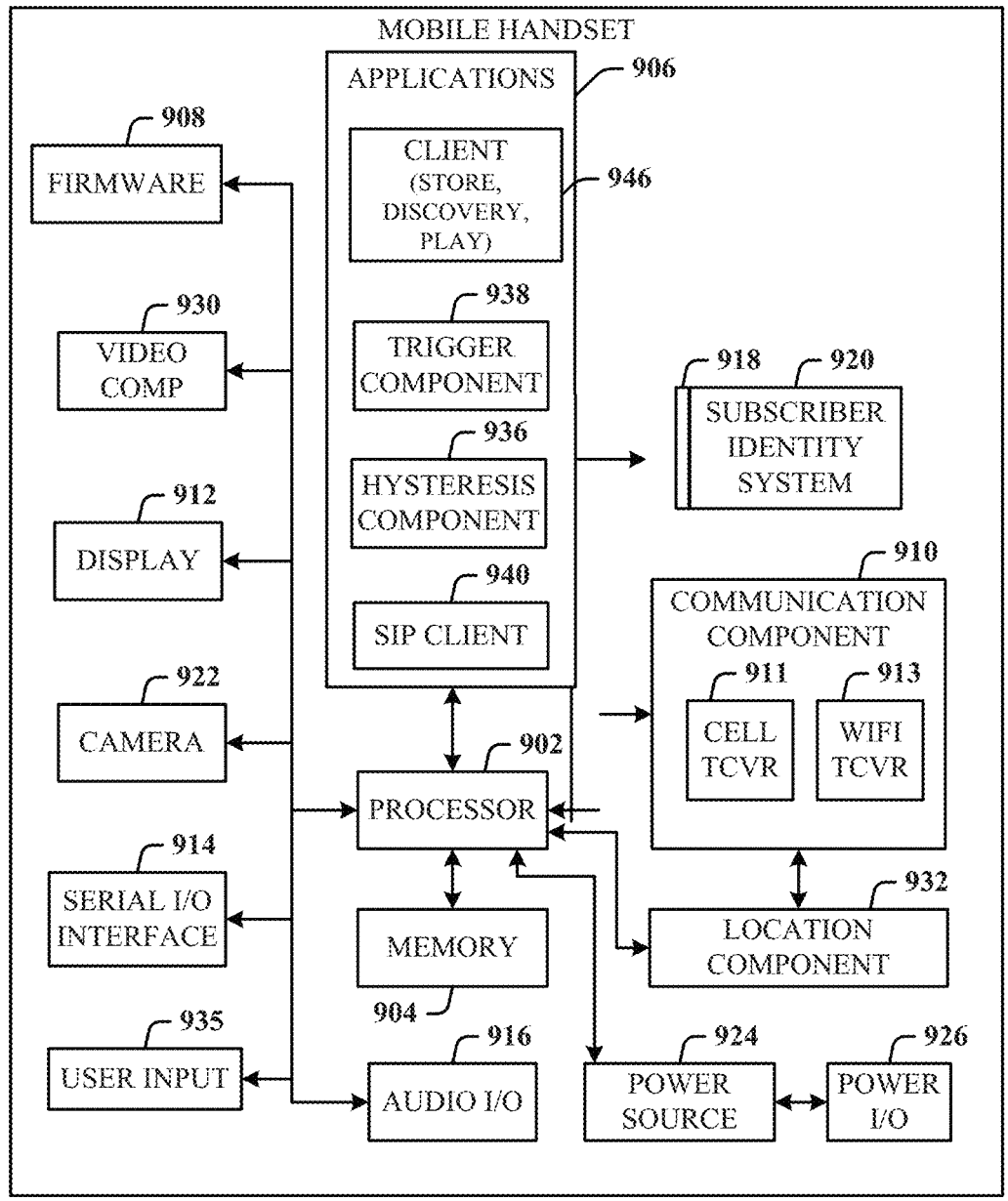
FIG. 9 illustrates an example block diagram of an example user equipment that can be a mobile handset operable to provide early termination in blind decoding in accordance with various aspects and embodiments of the subject disclosure.

Referring now to FIG. 9, illustrated is a schematic block diagram of an example end-user device such as a user equipment (e.g., mobile device 302 or 304) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900 can include an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
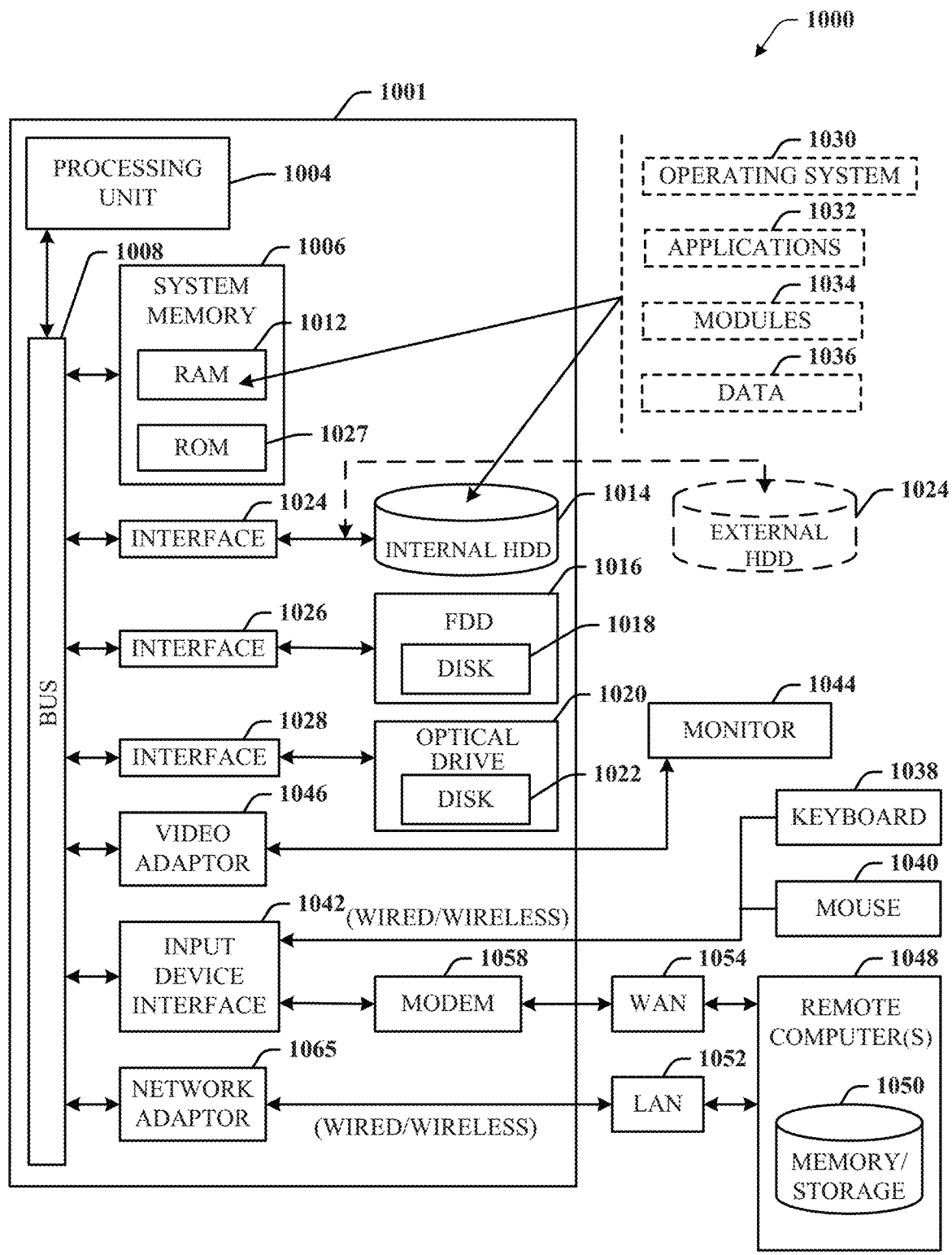
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 306) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations.

Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, comprising:
   decoding resource elements of a transmission based on an order specified by a priority list, wherein the priority list is selected based on a search space of the resource elements; and
   halting the decoding in response to identifying downlink control information in the transmission that comprises a termination bit that indicates that the downlink control information satisfies a defined criterion associated with the transmission.

2. The system of claim 1, wherein the decoding comprises iteratively decoding the resource elements to identify the downlink control information.

3. The system of claim 1, wherein the order is a first order, the priority list is a first priority list, and the resource elements are first resource elements, and wherein the operations further comprise:
   decoding second resource elements of the transmission based on a second order specified by a second priority list.

4. The system of claim 1, wherein the operations further comprise:
   decoding the downlink control information from a resource element in the search space of the resource elements.

5. The system of claim 1, wherein the search space comprises a user equipment specific search space.

6. The system of claim 1, wherein the search space of the resource elements comprises a common search space employed by user equipment associated with the transmission.

7. The system of claim 1, wherein the operations further comprise:
   in response to the search space of the resource elements being determined to be a user equipment specific search space specific to the system, configuring the priority list based on information received from a base station device.

8. A method, comprising:
   decoding, by a system comprising a processor, resource elements of a transmission based on an order specified by a priority list, wherein the priority list is selected based on a search space of the resource elements; and
   stopping, by the system, the decoding in response to identifying downlink control information in the transmission that comprises a termination bit that indicates that the downlink control information satisfies a defined criterion associated with the transmission.

9. The method of claim 8, wherein the decoding comprises iteratively decoding the resource elements to identify the downlink control information.

10. The method of claim 8, wherein the order is a first order, the priority list is a first priority list, and the resource elements are first resource elements; and further comprising:
    decoding, by the system, second resource elements of the transmission based on a second order specified by a second priority list.

11. The method of claim 8, further comprising:
    decoding, by the system, the downlink control information from a resource element in the search space of the resource elements.

12. The method of claim 8, wherein the search space comprises a user equipment specific search space.

13. The method of claim 8, wherein the search space of the resource elements comprises a common search space employed by user equipment associated with the transmission.

14. The method of claim 8, further comprising:

in response to the search space of the resource elements being determined to be a user equipment specific search space specific to the system, configuring, by the system, the priority list based on information received from a base station device.

15. A non-transitory machine-readable medium, comprising executable instructions that, when executed by a processor of a user equipment, facilitate performance of operations, comprising:

decoding resource elements of a transmission based on an order specified by a priority list, wherein the priority list is selected based on a search space of the resource elements; and ceasing the decoding in response to identifying downlink control information in the transmission that comprises a termination bit that indicates that the downlink control information satisfies a defined criterion associated with the transmission.

16. The non-transitory machine-readable medium of claim 15, wherein the decoding comprises iteratively decoding the resource elements to identify the downlink control information.

17. The non-transitory machine-readable medium of claim 15, wherein the order is a first order, the priority list is a first priority list, and the resource elements are first resource elements, and wherein the operations further comprise:

decoding second resource elements of the transmission based on a second order specified by a second priority list.

18. The non-transitory machine-readable medium of claim 15, wherein the operations further comprise decoding the downlink control information from a resource element in the search space of the resource elements.

19. The non-transitory machine-readable medium of claim 15, wherein the search space comprises a user equipment specific search space.

20. The non-transitory machine-readable medium of claim 15, wherein the search space of the resource elements comprises a common search space employed by user equipment associated with the transmission.

* * * * *